United States Patent
Sugiura et al.

(10) Patent No.: US 10,732,267 B2
(45) Date of Patent: Aug. 4, 2020

(54) ELECTRO-OPTICAL DISTANCE METER

(71) Applicant: TOPCON Corporation, Tokyo-to (JP)

(72) Inventors: Akinobu Sugiura, Tokyo-to (JP);
Masahiro Ohishi, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 447 days.

(21) Appl. No.: 15/634,254

(22) Filed: Jun. 27, 2017

(65) Prior Publication Data
US 2018/0011177 A1    Jan. 11, 2018

(30) Foreign Application Priority Data

Jul. 5, 2016 (JP) ................. 2016-133503

(51) Int. Cl.
*G01S 7/4913* (2020.01)
*G01S 7/497* (2006.01)
*G01S 17/10* (2020.01)
*G01S 7/481* (2006.01)
*G01S 17/32* (2020.01)

(52) U.S. Cl.
CPC .......... *G01S 7/4913* (2013.01); *G01S 7/4818* (2013.01); *G01S 7/497* (2013.01); *G01S 17/10* (2013.01); *G01S 17/32* (2013.01)

(58) Field of Classification Search
CPC ....... G01C 3/08; G01S 7/4818; G01S 17/325; G02B 6/14; G02B 6/4206; G02B 26/06
See application file for complete search history.

(56) References Cited

U.S. PATENT DOCUMENTS

| | | | |
|---|---|---|---|
| 5,815,251 A | 9/1998 | Ehbets et al. | |
| 6,356,344 B1 * | 3/2002 | Ohishi | G01C 3/08 250/526 |

(Continued)

FOREIGN PATENT DOCUMENTS

| | | |
|---|---|---|
| JP | 3-3126 A | 1/1991 |
| JP | 4-220585 A | 8/1992 |
| JP | 5-312951 A | 11/1993 |

OTHER PUBLICATIONS

European communication dated Dec. 12, 2017 in corresponding European patent application No. 17178931.6.

*Primary Examiner* — Luke D Ratcliffe
(74) *Attorney, Agent, or Firm* — Nields, Lemack & Frame, LLC

(57) ABSTRACT

An electro-optical distance meter comprises a light source for emitting a distance measuring light, a distance measuring optical system for leading a distance measuring light to a photodetector, an internal reference optical system for leading a part of the distance measuring light as an internal reference light to the photodetector, and an arithmetic processing unit for performing a distance measurement based on light receiving results of the distance measuring light and the internal reference light, wherein the internal reference optical system comprises a condenser lens, a scattering plate for scattering the internal reference light and for forming a secondary light source, and an optical fiber for leading the internal reference light to the photodetector and the internal reference optical system is constituted in such a manner that a light component of the internal reference light emitted from an arbitrary point within a whole surface of the secondary light source enters the optical fiber.

16 Claims, 3 Drawing Sheets

(56) References Cited

U.S. PATENT DOCUMENTS

| | | | |
|---|---|---|---|
| 2003/0020895 A1* | 1/2003 | Bridges | G01S 7/4811 356/4.01 |
| 2003/0107721 A1* | 6/2003 | Shirai | G01S 7/4812 356/4.01 |
| 2011/0270563 A1 | 11/2011 | Kanokogi et al. | |

* cited by examiner

ELECTRO-OPTICAL DISTANCE METER

BACKGROUND OF THE INVENTION

The present invention relates to an electro-optical distance meter which projects a distance measuring light to an object to be measured, receives a reflected distance measuring light from the object to be measured and measures a distance to the object to be measured based on a light receiving result.

The electro-optical distance meter projects the distance measuring light emitted from a light emitting element to the object to be measured through a distance measuring optical system, receives a distance measuring reflection light from the object to be measured by a photodetector through the distance measuring optical system and measures a distance to the object to be measured based on a time difference between a light emitting timing of the distance measuring light and a light receiving timing of the distance measuring reflection light.

Further, since a drift caused by a temperature change or the like occurs in a light emitting circuit, a light receiving circuit and an arithmetic circuit, the distance measuring optical system has an internal reference optical system in order to suppress an error caused by the circuit.

The internal reference optical system divides a part of the distance measuring light by an optical member such as a half mirror or the like and leads the divided distance measuring light as an internal reference light to the photodetector. As for the internal reference light, too, a time difference between a light emitting timing and a light receiving timing of the internal reference light is obtained, and a measurement distance is calculated based on a difference between a time difference obtained by the distance measuring light and a time difference obtained by the internal reference light. Alternatively, a measurement distance is calculated based on a time difference between a light receiving time of the internal reference light and a light receiving time of the distance measuring light.

By obtaining the difference between the time difference obtained by the distance measuring light and the time difference obtained by the internal reference light, error factors of the light emitting circuit, the light receiving circuit and the arithmetic circuit are offset, and a distance measurement with high accuracy is enabled.

Further, the light receiving timing when the photodetector detects the light is affected by a quality of a received light (brightness, light amount).

Therefore, in order to further improve the distance measurement accuracy, it is desired that qualities of the received lights of the distance measuring light and the internal reference light are also equal.

Conventionally, the internal reference light is obtained by dividing the distance measuring light, and the internal reference light itself has the same quality (a brightness distribution, a luminance speckles or the like are equal) as the quality of the distance measuring light.

However, at a moment when the distance measuring light is divided, the distance measuring light is a luminous flux having a diameter of several mm and thus, the internal reference light is also a similar luminous flux. On the other hand, a light receiving surface of the photodetector has a small diameter of several hundreds μm and thus, a limited part of the luminous flux of the internal reference light is received. A quality of a received light of the internal reference light is affected by a quality of the distance measuring light (the brightness distribution, a luminance speckles or the like), and the quality of the received light changes depending on a position where the received luminous flux is located within the luminous flux of the internal reference light.

Therefore, the quality of the received light of the internal reference light differs from the light receiving quality of the distance measuring tight, as a result, it is possible to cause a distance measurement error.

Further, a support position of the photodetector in the electro-optical distance meter can change in correspondence with a temperature change, and a positional change of the photodetector results in a positional change with respect to the internal reference light and thus, the temperature change can also cause the distance measurement error.

SUMMARY OF THE INVENTION

It is an object of the present invention to provide an electro-optical distance meter which improves a quality of a received light of an internal reference light and achieves an improvement of a distance measurement accuracy.

To attain the object as described above, an electro-optical distance meter according to the present invention comprises a light source for emitting a distance measuring light, a distance measuring optical system for projecting the distance measuring light to an object to be measured, for receiving a distance measuring light from the object to be measured and for leading to a photodetector, an internal reference optical system for leading a part of the distance measuring light as an internal reference light to the photodetector, and an arithmetic processing unit for performing a distance measurement based on a light receiving result of the distance measuring light and a light receiving result of the internal reference light, wherein the internal reference optical system comprises a condenser lens for condensing the internal reference light, a scattering plate for scattering the internal reference light condensed by the condenser lens and for forming a secondary light source, and an optical fiber for receiving the internal reference light emitted from the secondary light source and for leading to the photodetector and the internal reference optical system is constituted in such a manner that a light component of the internal reference light emitted from an arbitrary point within a whole surface of the secondary light source enters the optical fiber.

Further, in the electro-optical distance meter according to the present invention, the optical fiber is a bundle optical fiber in which optical fiber elements each with a thin diameter are bundled.

Further, the electro-optical distance meter according to the present invention comprises a condenser lens for condensing an internal reference light emitted from the secondary light source and for allowing the internal reference light to enter the optical fiber.

Further, in the electro-optical distance meter according to the present invention, assuming that a radius of the secondary light source formed on the scattering plate is rd, a radius of an incident end of the optical fiber is rf, and a smaller angle is θ, of a half angle θd of a spread angle of a luminous flux scattered by the scattering plate and an optical fiber receiving angle θf, an interval d between the secondary light source and the optical fiber is expressed as follows:

$$d \geq (rd+rf)/\tan\theta$$

Further, in the electro-optical distance meter according to the present invention, a light attenuation filter with a disk-like shape formed so that a light attenuation rate gradually changes in a circumferential direction is rotatably provided in an optical path of the internal reference light, and a light amount of the internal reference light received by the photodetector is adjusted by a rotation of the light attenuation filter.

Further, in the electro-optical distance meter according to the present invention, a light attenuation filter with disk-like shape formed so that a light attenuation rate gradually changes in a circumferential direction is provided integrally with the scattering plate, wherein the scattering plate is rotatable and a light amount of the internal reference light received by the photodetector is adjusted by a rotation of the scattering plate.

Further, the electro-optical distance meter according to the present invention further comprises a branch mirror provided in the distance measuring optical system for branching the internal reference light from the distance measuring light and for directing toward an internal reference optical path, wherein the branch mirror is designed to be capable of being insertable and removable in a distance measuring optical path.

Furthermore, the electro-optical distance meter according to the present invention further comprises a branch mirror provided in the distance measuring optical system for branching the internal reference light from the distance measuring light and for directing toward an internal reference optical path and a shutter for alternatively shutting off the distance measuring light or the internal reference light.

According to the present invention, the electro-optical distance meter comprises a light source for emitting a distance measuring light, a distance measuring optical system for projecting the distance measuring light to an object to be measured, for receiving a distance measuring light from the object to be measured and for leading to a photodetector, an internal reference optical system for leading a part of the distance measuring light as an internal reference light to the photodetector, and an arithmetic processing unit for performing a distance measurement based on a light receiving result of the distance measuring light and a light receiving result of the internal reference light wherein the internal reference optical system comprises a condenser lens for condensing the internal reference light, a scattering plate for scattering the internal reference light condensed by the condenser lens and for forming a secondary light source, and an optical fiber for receiving the internal reference light emitted from the secondary light source and for leading to the photodetector and the internal reference optical system is constituted in such a manner that a light component of the internal reference light emitted from an arbitrary point within a whole surface of the secondary light source enters the optical fiber. As a result, a light component of the distance measuring light is included in a whole range of the luminous flux of the internal reference light, qualities of a reflected distance measuring light and the internal reference light become same, thus the distance measuring accuracy is improved, and a reliability with respect to an environmental change is improved.

DETAILED DESCRIPTION OF THE PREFERRED EMBODIMENTS

A description will be given below on embodiments of the present invention by referring to the attached drawings.

Figure 1:
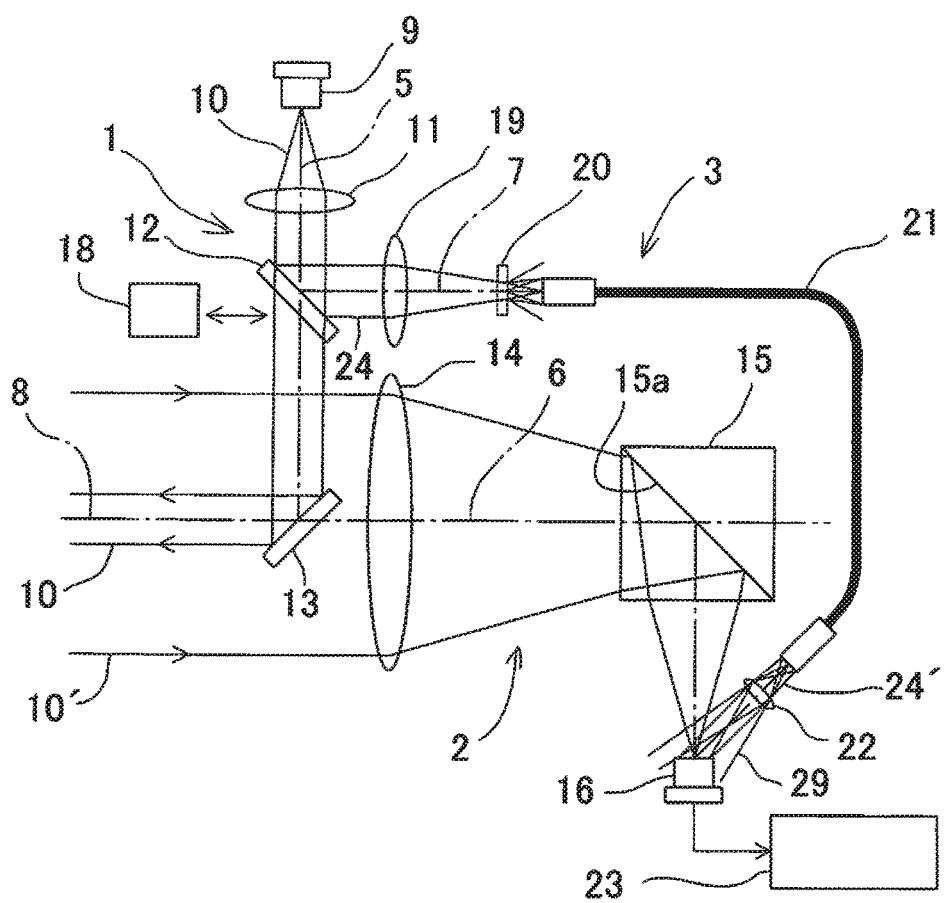
FIG. 1 is a schematical drawing of an optical system of a first embodiment of the present invention.

FIG. 1 shows general features of an optical system of an electro-optical distance meter according to a first embodiment of the present invention.

The optical system mainly has a light projecting optical system 1, a light receiving optical system 2 and an internal reference optical system 3.

The light projecting optical system 1 has a light projecting optical axis 5, the light receiving optical system 2 has a light receiving optical axis 6 and the internal reference optical system 3 has an internal reference optical axis 7.

On the light projecting optical axis 5, a light source 9 for emitting a distance measuring light 10 is provided, and further, on the light projecting optical axis 5 toward an object side, a condenser lens 11, a branch mirror 12 and a reflection mirror 13 as a deflection optical member are provided.

The light projecting optical axis 5 is deflected by the reflection mirror 13, and the light projecting optical axis 5 as deflected becomes a distance measuring optical axis 8 toward an object to be measured. The condenser lens 11, the reflection mirror 13 or the like make up the light projecting optical system 1.

The light receiving optical axis 6 crosses the light projecting optical axis 5 on a reflection surface of the reflection mirror 13, and the light receiving optical axis 6 transmitting the reflection mirror 13 coincides with the distance measuring optical axis 8.

On an image side of the reflection mirror 13 of the light receiving optical axis 6, an image-forming lens 14 and a beam splitter 15 are provided. The beam splitter 15 functions as a wavelength selection optical member and a deflection optical member and has a reflection surface 15a which reflects only a distance measuring light, and the reflection surface 15a deflects the light receiving optical axis 6. On the light receiving optical axis 6 as deflected, a photodetector 16 is provided.

The image-forming lens 14, the beam splitter 15 or the like make up the light receiving optical system 2. Further, the light receiving optical system 2 and the light projecting optical system 1 make up a distance measuring optical system.

The branch mirror 12 is an optical member for branching the internal reference optical axis 7 from the light projecting optical axis 5, and the branch mirror 12 can be inserted/removed by an optical path switching driver 18 into/from the light projecting optical axis 5. In a state where the branch mirror 12 is removed from the light projecting optical axis 5, the distance measuring light 10 enters the reflection mirror 13 and is further reflected by the reflection mirror 13 and is projected to the object to be measured.

In a state where the branch mirror 12 is inserted into the light projecting optical axis 5, the light projecting optical axis 5 is branched by the branch mirror 12, and the optical axis as branched becomes the internal reference optical axis 7.

On the internal reference optical axis 7, a condenser lens 19, a scattering plate 20, an optical fiber 21 and a condenser lens 22 are provided.

An incident end surface of the optical fiber 21 is set in a condition directly faced with the scattering plate 20, and the incident end surface is arranged on the optical axis of the condenser lens 19. On the internal reference optical axis 7 extending from a projecting end of the optical fiber 21, the condenser lens 22 and the photodetector 16 are disposed. A light receiving signal from the photodetector 16 is input into an arithmetic processing unit 23.

The condenser lens 19, the scattering plate 20, the optical fiber 21, the condenser lens 22 or the like make up the internal reference optical system 3.

Figure 2:
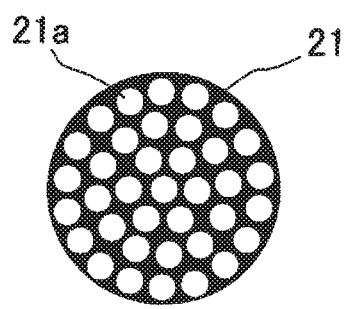
FIG. 2 is a cross-sectional view of an optical fiber used in the embodiment.

The optical fiber 21 is a bundle optical fiber in which many optical fiber elements 21a each having a small diameter are bundled as shown in FIG. 2.

A description will be given below on an action of a first embodiment.

First, in a state where the branch mirror 12 is removed from an optical path of the distance measuring light 10, the distance measuring light 10 is projected to an object to be measured (not, shown).

The distance measuring light 10 is emitted from the light source 9, is turned to a parallel luminous flux by the condenser lens 11 and enters the reflection mirror 13. The distance measuring light 10 is reflected on the distance measuring optical axis 8 by the reflection mirror 13 and is projected to the object to be measured.

A reflected distance measuring light 10' from the object to be measured enters the image-forming lens 14, is reflected by a reflection surface 15a of the beam splitter 15 and is focused on the photodetector 16. The reflection surface 15a has an optical characteristic of reflecting only the distance measuring light and a noise light is removed by an optical action of the reflection surface 15a.

A light amount adjusting means (not shown) may be provided between the beam splitter 15 and the photodetector 16. The light amount adjusting means adjusts a light amount of a reflected distance measuring light 10' incident to the photodetector 16 so as to become equal or approximately equal.

When the photodetector 16 receives the reflected distance measuring light 10', the photodetector 16 inputs a light receiving signal to an arithmetic processing unit 23.

Next, the branch mirror 12 is inserted into the optical path of the distance measuring light 10 by the optical path switching driver 18. The branch mirror 12 is a partial reflection mirror (a light amount dividing member), and a part of the distance measuring light 10 is reflected by the branch mirror 12. The part of the distance measuring light 10 as reflected enters the condenser lens 19 as an internal reference light 24. Here, a reflectance of the branch mirror 12 is set so that a light intensity of the internal reference light 24 becomes an appropriate light intensity at which the photodetector 16 is not saturated.

The condenser lens 19 condenses the internal reference light 24 toward the scattering plate 20. Further, the internal reference light 24 is transmitted through the scattering plate 20 in a process to the incident end surface and is scattered by the scattering plate 20. The internal reference light 24 of a scattered light from the scattering plate 20 is emitted, and an internal reference light 24 emitting portion of the scattering plate 20 forms a secondary light source.

Figure 3:
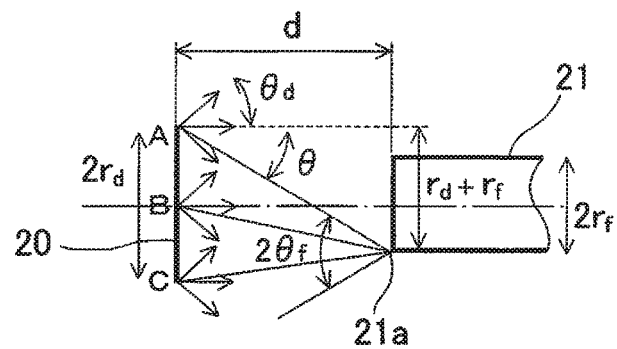
FIG. 3 is an explanatory drawing showing an action of a scattering plate used in the embodiment.

An action of the scattering plate 20 is shown in FIG. 3.

In FIG. 3, a diameter of the internal reference light 24 when entering the scattering plate 20 (that is, the secondary light source formed on the scattering plate 20) is represented as 2rd, a diameter of the optical fiber 21 is represented as 2rf, a distance between the scattering plate 20 and the incident end surface of the optical fiber 21 is represented as d, a scattering angle by the scattering plate 20 is represented as $2\theta d$, and a receiving angle (NA) of the optical fiber element 21a is represented as $2\theta f$.

Assuming that the distance measuring light 10 is an aggregate of micro luminous fluxes, the distance measuring light 10 has a light intensity distribution or has light amount speckles, and each of the luminous fluxes has a characteristic of reflecting the light intensity distribution or the light amount speckles. Hereinafter, the micro luminous flux is referred as a light component which constitutes the distance measuring light 10.

In FIG. 3, a light component positioned at an upper end A of the internal reference light 24 spreads at a scattering angle $2\theta d$. Assuming that an incident angle is $\theta$ when the light component from the upper end A enters a lowermost end (a point where entering is the most difficult) of the incident end surface of an optical fiber 21, the incident angle $\theta$ is set so as to be smaller than the scattering angles $\theta d$ and $\theta f$.

Similarly, the incident angle $\theta$, when the light component from a lower end C enters the lowermost end (a point where entering is the most difficult) of the incident end surface of the optical fiber 21, is set so as to be smaller than the scattering angles $\theta d$ and $\theta f$.

When the light components from the upper end A and the lower end C are set so as to enter the optical fiber element 21a, all the light components constituting the internal reference light 24 including a light component from a middle point B enter into each of all the optical fiber elements 21a.

A condition that all the light components constituting the internal reference light 24 enter into each of all the optical fiber elements 21a, that is to say, a condition that the light components enter from a whole surface of the secondary light source is:

assuming that a radius of the secondary light source formed on the scattering plate 20 is rd, a radius of the incident end of the optical fiber is rf, and the smaller angle in a half angle $\theta d$ of a spread angle of the luminous flux scattered by the scattering plate 20 and an optical fiber receiving angle $2\theta f$ is $\theta$, the following is formed:

$$d \geq (rd+rf)/\tan \theta \qquad (1)$$

The formula (1) as described above indicates a proper lower limit value of the distance d between the scattering plate 20 and the incident end surface of the optical fiber 21, and though an upper limit value does not particularly exist, the larger the distance d becomes, the more the light amount of the internal reference light 24 incident to the optical fiber 21 decreases, so a waste increases. Therefore, the distance d is the smallest in manufacture or the manufacture is easy and also the distance d is $d \geq (rd+rf)/\tan \theta$.

The light component incident to the optical fiber element 21a propagates while being reflected by an inner surface of the optical fiber element 21a and thus, the light component is mixed also in a process of passing through the optical fiber element 21a.

Therefore, an internal reference light 29 as emitted from the condenser lens 22 maintains a state when mixed by the scattering plate 20. The internal reference light 29 as emitted from the condenser lens 22 is turned to the parallel luminous flux by the condenser lens 22 and is received by the photodetector 16.

The internal reference light 24 is emitted from an emitting end surface of the optical fiber 21 having a size of a diameter of 2rf, so the internal reference light 29 made the parallel luminous flux by the condenser lens 22 has a spread. Further, since the light receiving surface of the photodetector 16 is small, the internal reference light 29 as received by the photodetector 16 is limited to an only fraction.

On the other hand, an internal reference light 24' as emitted from each of the optical fiber elements 21a as described above has all the components of the internal reference light 24, respectively, and thus, the components of the internal reference light 29 are the same as the components of the reflected distance measuring light 10'.

A light receiving result of the internal reference light 29 is input into the arithmetic processing unit 23 from the photodetector 16, and in the arithmetic processing unit 23, a distance measurement to the object to be measured is performed based on a light receiving result of the distance measuring light 10 and a light receiving result of the internal reference light 29.

Since the components of the internal reference light 29 are the same as the components of the reflected distance measuring light 10', an accuracy of the distance measurement by the distance measuring light 10 and the internal reference light 29 can be improved.

Further, since the internal reference light 29 as transmitted through the condenser lens 22 has a spread angle sufficiently larger than the light receiving surface of the photodetector 16, and all the luminous fluxes of the internal reference light 24 are the same component (including all the components of the distance measuring light 10), any part of the internal reference light 24 may be received by the photodetector 16. An alignment between the optical fiber 21 and the photodetector 16 does not require an accuracy, so an assembling becomes easy.

It is to be noted that, if the emitting end surface of the optical fiber 21 can be arranged close to the light receiving surface of the photodetector 16, a loss of a light amount is small, and the condenser lens 22 can be omitted.

It is to be noted that, in a case where a homogenized state by the scattering plate 20 is maintained or is not largely lost, the optical fiber 21 does not have to be an aggregate of thin optical fiber elements 21a but may be constituted by a single optical fiber element 21a.

A description will be given on a second embodiment of the present invention by referring to FIG. 4.

Figure 4:
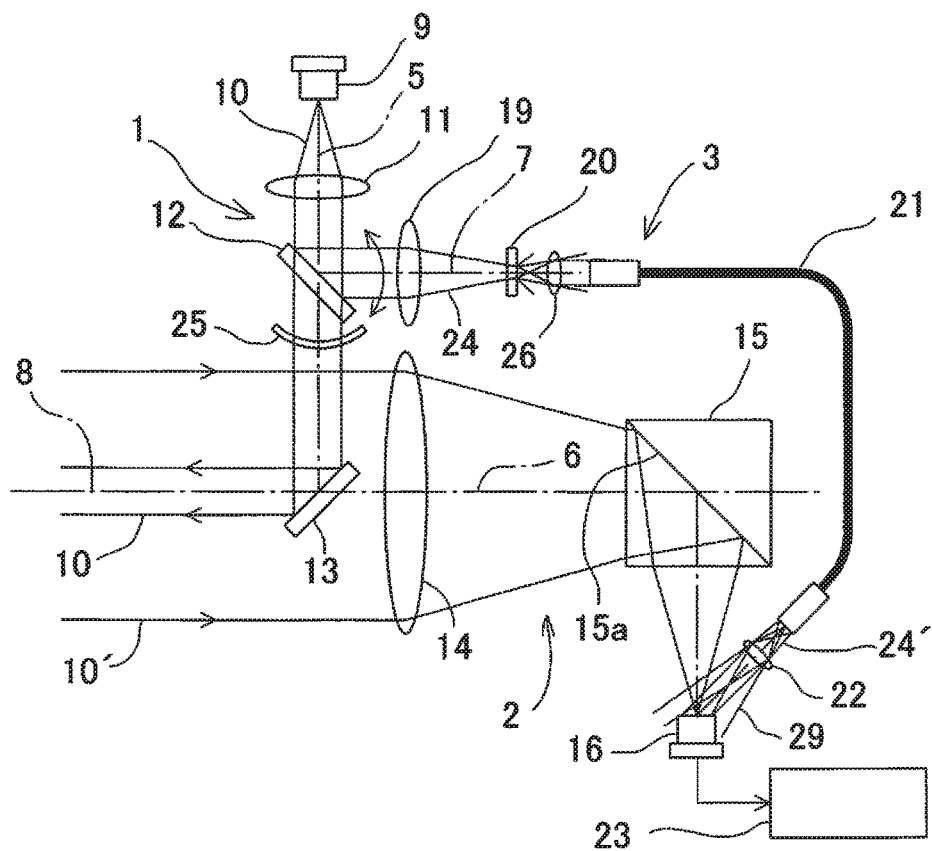
FIG. 4 is a schematical drawing of an optical system of a second embodiment of the present invention.

It is to be noted that, in FIG. 4, what are equivalent to components as shown in FIG. 1 are referred by the same symbol, and the detailed description thereof will be omitted.

In the second embodiment, the branch mirror 12 is fixed and is designed as a half mirror for reflecting a part of a distance measuring light 10 as an internal reference light 24 and for transmitting a remaining part as a distance measuring light 10. Further, a reflectance of the branch mirror 12 is set so as to reflect an appropriate light intensity by which the photodetector 16 is not saturated.

A shutter 25 is provided as an optical path switching means, and the shutter 25 is constituted so as to move between a light projecting optical axis 5 and an internal reference optical axis 7 and to alternatively shut off the distance measuring light 10 and the internal reference light 24.

A condenser lens 26 is provided between a scattering plate 20 and an incident end surface of an optical fiber 21.

In the second embodiment, when the distance measuring light 10 is emitted, the shutter 25 is positioned on the internal reference optical axis 7 and shuts off the optical path of the internal reference light 24.

Further, in a state where the shutter 25 is on the light projecting optical axis 5 and shuts off the optical path of the distance measuring light 10, the internal reference light 24 is reflected by the branch mirror 12 and enters the incident end surface of the optical fiber 21 through the scattering plate 20 and the condenser lens 26.

Figure 5:
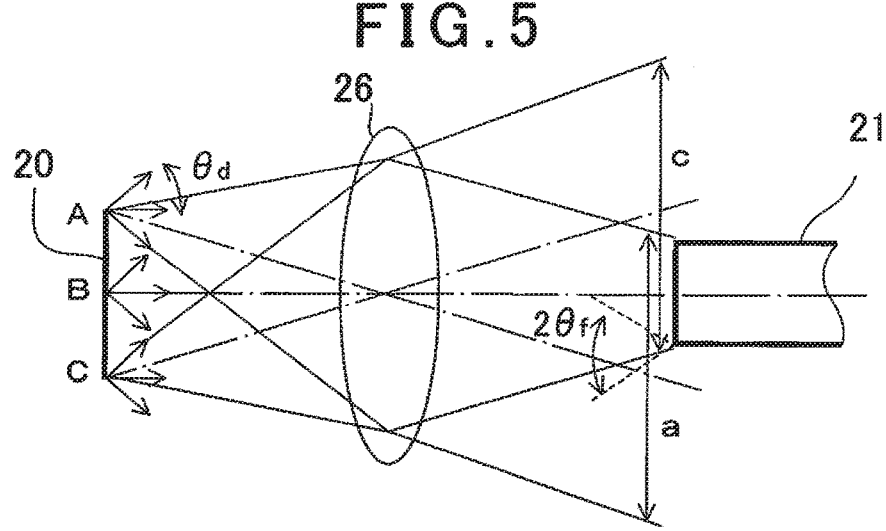
FIG. 5 is an explanatory drawing showing actions of a scattering plate and a condenser lens in the second embodiment of the present invention.

A description will be given on an action of the condenser lens 26 by referring to FIG. 5.

A luminous flux emitted from A point of the scattering plate 20 as a light source is turned to a parallel luminous flux by the condenser lens 26 and is irradiated on the incident end surface of the optical fiber 21 within an irradiation range a. Further, a luminous flux emitted from C point as the light source is turned to the parallel luminous flux by the condenser lens 26 and is irradiated on the incident end surface of the optical fiber 21 within an irradiation range c.

Therefore, more luminous fluxes enter the incident end surface of the optical fiber 21, and a loss of a light amount is decreased.

Figure 6:
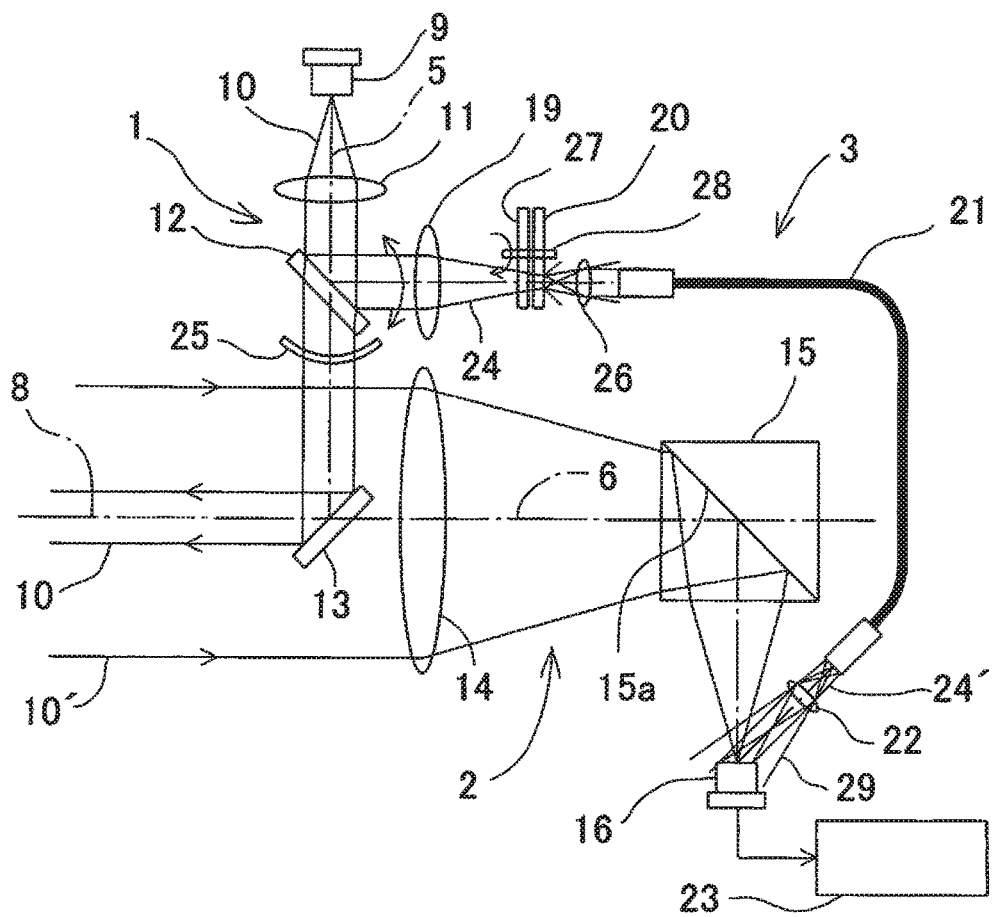
FIG. 6 is a schematical drawing of an optical system of a third embodiment of the present invention.

FIG. 6 shows a third embodiment.

A light attenuation filter 27 is provided on an incident side or an emitting side (the incident side in the figure) of a scattering plate 20.

The light attenuation filter 27 is designed in a disk-like shape and is rotatable around a support shaft 28. The light attenuation filter 27 is formed so that a density (a light attenuation rate) gradually changes in a circumferential direction.

An internal reference light 24 transmits through a periphery of the attenuation filter 27. Therefore, the internal reference light 24 transmitting the light attenuation filter 27 is configured in such a manner that a light amount is increased/decreased by rotating the light attenuation filter 27 according to a rotating direction.

Instead of setting and managing a reflectance of the branch mirror 12, it is possible to set an appropriate light intensity by which the photodetector 16 is not saturated by selecting a rotational position of the light attenuation filter 27.

Thus, a distance measuring accuracy is further improved by a homogenization of the light components by the scattering plate 20 and a matching of the light amounts.

The scattering plate 20 and the light attenuation filter 27 may be integrated. For instance, a film of the light attenuation filter 27 is bonded to one surface of the scattering plate 20 so that the scattering plate 20 has a light attenuation filter function.

By rotating the scattering plate 20, the light amount adjustment and the homogenization of the light components can be performed at the same time. Further, the number of parts is reduced, and a configuration is simplified.

The invention claimed is:

1. An electro-optical distance meter comprising: a light source for emitting a distance measuring light, a distance measuring optical system for projecting said distance measuring light to an object to be measured, for receiving a distance measuring light from said object to be measured and for leading to a photodetector, an internal reference optical system for leading a part of said distance measuring light as an internal reference light to said photodetector, and an arithmetic processing unit for performing a distance measurement based on a light receiving result of said distance measuring light and a light receiving result of said internal reference light, wherein said internal reference optical system comprises a condenser lens for condensing said internal reference light, a scattering plate for scattering said internal reference light condensed by said condenser lens and for forming a secondary light source, and an optical fiber for receiving said internal reference light emitted from said secondary light source and for leading to said photodetector and said internal reference optical system is constituted in such a manner that a light component of said internal reference light emitted from an arbitrary point within a whole surface of said secondary light source enters said optical fiber, wherein, assuming that a radius of said secondary light source formed on said scattering plate is rd, a radius of an incident end of said optical fiber is rf, and a smaller angle is θ, of a half angle θd of a spread angle of a luminous flux scattered by said scattering plate and an optical fiber receiving angle θf, an interval d between said secondary light source and said optical fiber is expressed as follows:

$$d \geq (rd+rf)/\tan \theta.$$

2. The electro-optical distance meter according to claim 1, wherein said optical fiber is a bundle optical fiber in which optical fiber elements each with a thin diameter are bundled.

3. The electro-optical distance meter according to claim 2, comprising a condenser lens for condensing an internal reference light emitted from said secondary light source and for allowing said internal reference light to enter said optical fiber.

4. The electro-optical distance meter according to claim 2, wherein a light attenuation filter with disk-like shape formed so that a light attenuation rate gradually changes in a circumferential direction is provided integrally with said scattering plate, wherein said scattering plate is rotatable and a light amount of said internal reference light received by said photodetector is adjusted by a rotation of said scattering plate.

5. The electro-optical distance meter according to claim 1, comprising a condenser lens for condensing an internal reference light emitted from said secondary light source and for allowing said internal reference light to enter said optical fiber.

6. The electro-optical distance meter according to claim 5, wherein a light attenuation filter with disk-like shape formed so that a light attenuation rate gradually changes in a circumferential direction is provided integrally with said scattering plate, wherein said scattering plate is rotatable and a light amount of said internal reference light received by said photodetector is adjusted by a rotation of said scattering plate.

7. The electro-optical distance meter according to claim 1, wherein a light attenuation filter with disk-like shape formed so that a light attenuation rate gradually changes in a circumferential direction is provided integrally with said scattering plate, wherein said scattering plate is rotatable and a light amount of said internal reference light received by said photodetector is adjusted by a rotation of said scattering plate.

8. The electro-optical distance meter according to claim 1, further comprising a branch mirror provided in said distance measuring optical system for branching said internal reference light from said distance measuring light and for directing toward an internal reference optical path, wherein said branch mirror is designed to be capable of being insertable and removable in a distance measuring optical path.

9. The electro-optical distance meter according to claim 1, further comprising a branch mirror provided in said distance measuring optical system for branching said internal reference light from said distance measuring light and for directing toward an internal reference optical path and a shutter for alternatively shutting off said distance measuring light or said internal reference light.

10. An electro-optical distance meter comprising: a light source for emitting a distance measuring light, a distance measuring optical system for projecting said distance measuring light to an object to be measured, for receiving a distance measuring light from said object to be measured and for leading to a photodetector, an internal reference optical system for leading a part of said distance measuring light as an internal reference light to said photodetector, and an arithmetic processing unit for performing a distance measurement based on a light receiving result of said distance measuring light and a light receiving result of said internal reference light, wherein said internal reference optical system comprises a condenser lens for condensing said internal reference light, a scattering plate for scattering said internal reference light condensed by said condenser lens and for forming a secondary light source, and an optical fiber for receiving said internal reference light emitted from said secondary light source and for leading to said photodetector and said internal reference optical system is constituted in such a manner that a light component of said internal reference light emitted from an arbitrary point within a whole surface of said secondary light source enters said optical fiber, and wherein a light attenuation filter with a disk-like shape formed so that a light attenuation rate gradually changes in a circumferential direction is rotatably provided in an optical path of said internal reference light, and a light amount of said internal reference light received by said photodetector is adjusted by a rotation of said light attenuation filter.

11. The electro-optical distance meter according to claim 10, wherein said optical fiber is a bundle optical fiber in which optical fiber elements each with a thin diameter are bundled.

12. The electro-optical distance meter according to claim 10, comprising a condenser lens for condensing an internal reference light emitted from said secondary light source and for allowing said internal reference light to enter said optical fiber.

13. The electro-optical distance meter according to claim 10, wherein the light attenuation filter with disk-like shape formed so that the light attenuation rate gradually changes in a circumferential direction is provided integrally with said scattering plate, wherein said scattering plate is rotatable and a light amount of said internal reference light received by said photodetector is adjusted by a rotation of said scattering plate.

14. The electro-optical distance meter according to claim 10, further comprising a branch mirror provided in said distance measuring optical system for branching said internal reference light from said distance measuring light and for directing toward an internal reference optical path, wherein said branch mirror is designed to be capable of being insertable and removable in a distance measuring optical path.

15. The electro-optical distance meter according to claim 10, further comprising a branch mirror provided in said distance measuring optical system for branching said internal reference light from said distance measuring light and for directing toward an internal reference optical path and a shutter for alternatively shutting off said distance measuring light or said internal reference light.

16. The electro-optical distance meter according to claim 11, comprising a condenser lens for condensing an internal reference light emitted from said secondary light source and for allowing said internal reference light to enter said optical fiber.

* * * * *